United States Patent
Hu et al.

(10) Patent No.: US 12,411,295 B2
(45) Date of Patent: Sep. 9, 2025

(54) PLUGGABLE OPTICAL PACKING STRUCTURE

(71) Applicant: FOCI FIBER OPTIC COMMUNICATIONS, INC., Hsinchu (TW)

(72) Inventors: Ting-Ta Hu, Hsinchu (TW); Po-Yi Wu, Hsinchu (TW); Chieh-Yu Fang, Hsinchu (TW); Ting-Yan Lin, Hsinchu (TW); Chia-Kuo Chen, Hsinchu (TW)

(73) Assignee: FOCI FIBER OPTIC COMMUNICATIONS, INC., Hsinchu (TW)

( * ) Notice: Subject to any disclaimer, the term of this patent is extended or adjusted under 35 U.S.C. 154(b) by 245 days.

(21) Appl. No.: 18/207,239

(22) Filed: Jun. 8, 2023

(65) Prior Publication Data

US 2024/0353635 A1    Oct. 24, 2024

(30) Foreign Application Priority Data

Apr. 20, 2023  (TW) ................. 112114693

(51) Int. Cl.
*H04B 10/00*    (2013.01)
*G02B 6/42*    (2006.01)

(52) U.S. Cl.
CPC .......... *G02B 6/4278* (2013.01); *G02B 6/423* (2013.01); *G02B 6/4269* (2013.01)

(58) Field of Classification Search
CPC .... G02B 6/4278; G02B 6/423; G02B 6/4269; G02B 6/4249; G02B 6/43; G02B 6/421; G02B 6/4292; G02B 6/4201; G02B 6/3825; G02B 6/3834; G02B 6/3881; G02B 6/4204; G02B 6/4228; G02B 6/426

See application file for complete search history.

(56) References Cited

U.S. PATENT DOCUMENTS

| | | | | |
|---|---|---|---|---|
| 6,789,959 | B1* | 9/2004 | Conn ................... | G02B 6/4292 385/94 |
| 11,109,515 | B1* | 8/2021 | Nagarajan .......... | H04Q 11/0005 |
| 2007/0258683 | A1* | 11/2007 | Rolston .................... | G02B 6/43 385/88 |
| 2016/0381442 | A1* | 12/2016 | Heanue ................ | G02B 6/4269 398/45 |
| 2017/0068049 | A1* | 3/2017 | Dangel ................ | G02B 6/1221 |
| 2021/0048587 | A1* | 2/2021 | Denoyer ................ | H01L 24/81 |
| 2022/0166533 | A1* | 5/2022 | Stojanovic ........... | G02B 6/4292 |
| 2022/0179159 | A1* | 6/2022 | Wu ........................ | G02B 6/4271 |

(Continued)

*Primary Examiner* — Agustin Bello (57) ABSTRACT

A pluggable optical packaging structure is provided, including: a substrate, a carrier ring, at least one optical connection assembly and a cover plate; the substrate includes at least one electronic integrated circuit (EIC) and at least one photonic integrated circuit (PIC); the carrier ring is located on the substrate, and the EIC and PIC are enclosed by the carrier ring; the optical connection assembly includes at least one socket, at least one connector, a plurality of optical fibers and at least one optical fiber array connector, the socket is located in a partial section of the carrier ring, the connector is in the socket, the optical fibers has one end coupled to the connector, the other end coupled to the fiber array connector, and is coupled to the PIC through the fiber array connector; the cover plate is located on the carrier ring and extends inwardly to above the PIC.

6 Claims, 7 Drawing Sheets

(56) References Cited

U.S. PATENT DOCUMENTS

| | | | | |
|---|---|---|---|---|
| 2022/0196929 A1* | 6/2022 | Toda | ................... | G02B 6/4201 |
| 2022/0196933 A1* | 6/2022 | Patel | ................... | G02B 6/4278 |
| 2022/0196939 A1* | 6/2022 | Toda | ................... | G02B 6/4249 |
| 2022/0196941 A1* | 6/2022 | Toda | ................... | G02B 6/4243 |
| 2022/0199881 A1* | 6/2022 | Toda | ................... | G02B 6/4269 |
| 2022/0308294 A1* | 9/2022 | Morgan | ............... | G02B 6/4278 |
| 2022/0374575 A1* | 11/2022 | Ramey | ................... | G06F 30/38 |
| 2023/0060862 A1* | 3/2023 | Patel | ................... | G02B 6/423 |
| 2023/0084003 A1* | 3/2023 | Taha | ................... | G02B 6/3672 |
| | | | | 385/31 |
| 2023/0204879 A1* | 6/2023 | Kim | ................... | G02B 6/4249 |
| | | | | 385/33 |
| 2023/0341622 A1* | 10/2023 | Chiu | ................... | G02B 6/1225 |
| 2023/0393355 A1* | 12/2023 | Zbinden | ............... | G02B 6/4278 |
| 2024/0053553 A1* | 2/2024 | Shikama | ............. | G02B 6/3886 |
| 2024/0353635 A1* | 10/2024 | Hu | ........................ | G02B 6/423 |

* cited by examiner

PLUGGABLE OPTICAL PACKING STRUCTURE

BACKGROUND OF THE INVENTION

1. Field of the Invention

The present invention relates generally to a pluggable optical packaging structure, and more particularly, to a pluggable optical packaging structure involving simultaneous packaging of photonic integrated circuits and electronic integrated circuits.

2. The Prior Arts

Application-Specific Integrated Circuit (ASIC) is an integrated circuit die designed and customized by developers according to the needs of specific applications, which is highly customizable and professional. ASIC can be used in various fields, such as communication, computer, automotive electronics, medical equipment, etc., and demands high performance and reliability. With the continuous demand for computing speed, certain ASICs will have both a Photonic Integrated Circuit (PIC) and an Electronic Integrated Circuit (EIC), so that the original electrical signal can be converted into an optical signal to cope with the ever-increasing computing speed.

In the optical packaging structure, the electronic integrated circuit couples the signal to the photonic integrated circuit, so that the electrical signal is converted into an optical signal, and the optical fiber array connected to the photonic integrated circuit is used to receive or transmit the optical signal. The main medium for optical signal transmission is optical fiber, but if there are many exposed optical fibers in the initial optical packaging structure, the difficulty of packaging operations will increase as well as the defect rate. It is because the packaging process must be carried out between each workstation, pulling or touching the optical fibers accidentally may cause fiber breakage or damage to other components during the process of continuous movement. In addition, in this type of optical packaging structure, the alignment of optical signals is a very important and difficult task. Because the accuracy requirements are strict, if misalignment occurs on any components, including photonic integrated circuits, optical fiber array connectors, and socket connectors, it will take a lot of time to rectify the mistake, which is time-consuming and labor-intensive. How to simplify the difficulty of assembly and maintain the accuracy of alignment is also a subject that must be investigated and improved by the present invention. Therefore, the primary objective of the present invention is to provide a pluggable optical packaging structure to address this problem.

SUMMARY OF THE INVENTION

In order to achieve the foregoing objective, the present invention adopts the following technical solutions:

The present invention provides is a pluggable optical packaging structure, comprising: a substrate, a carrier ring, at least one optical connection assembly and a cover plate, the substrate being-disposed with at least one electronic integrated circuit and at least one photonic integrated circuit; the carrier ring being located on the substrate, and the electronic integrated circuit and the photonic integrated circuit being in an area enclosed by the carrier ring; the optical connection assembly comprising at least one socket, at least one connector, a plurality of optical fibers and at least one optical fiber array connector, the socket being located in a partial section of the carrier ring, the connector being disposed in the socket, the optical fibers having one end coupled to the connector, the other end coupled to the fiber array connector, and coupled to the photonic integrated circuit through the fiber array connector; the cover plate being located on the carrier ring and extending inwardly to above the photonic integrated circuit.

In a preferred embodiment, the present invention also comprises a heat dissipation unit, the cover plate has a window at the center, and the heat dissipation unit is located in the window and is in contact with the electronic integrated circuit.

In a preferred embodiment, the heat dissipation unit is a heat sink, and the heat sink is located on the electronic integrated circuit.

In a preferred embodiment, the socket has at least one docking chamber, and the connector is arranged in the docking chamber.

In a preferred embodiment, the carrier ring has at least one gap, and the socket is arranged in the gap.

In a preferred embodiment, the carrier ring comprises a plurality of fixing pieces stacked up and down in sequence and a bottom ring, the bottom ring is a closed ring and is located on the substrate, and the plurality of the fixing pieces are arranged on the bottom ring and form at least one gap, and the socket is located in the gap.

In a preferred embodiment, the gap also has at least one positioning groove, at least one lug is provided at a corresponding position of the socket, and when the socket is arranged in the gap, the lug is also in the positioning groove.

In a preferred embodiment, the optical fiber array connector has at least one first coupling portion, at least one second coupling portion is provided at a corresponding position of the top of the photonic integrated circuit, and when the optical fiber array connector is arranged on the photonic integrated circuit, the first coupling portion is coupled to the second coupling portion.

Compared with the prior art, the pluggable optical packaging structure of the present invention utilizes the optical connection assembly as a medium for external docking, and surrounds and shields the photonic integrated circuits and the electronic integrated circuits on the substrate in the area enclosed by the carrier ring and the cover plate to avoid the exposure of the optical fiber during the packaging operation and improve the yield rate of the packaging operation. In addition, positioning grooves or docking structures of corresponding shapes are used between the components of the present invention for passive alignment assembly method so as to greatly reduce the calibration and alignment time between components, shorten the assembly time, and improve product yield.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The technical solutions of the present invention will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

Figure 1:
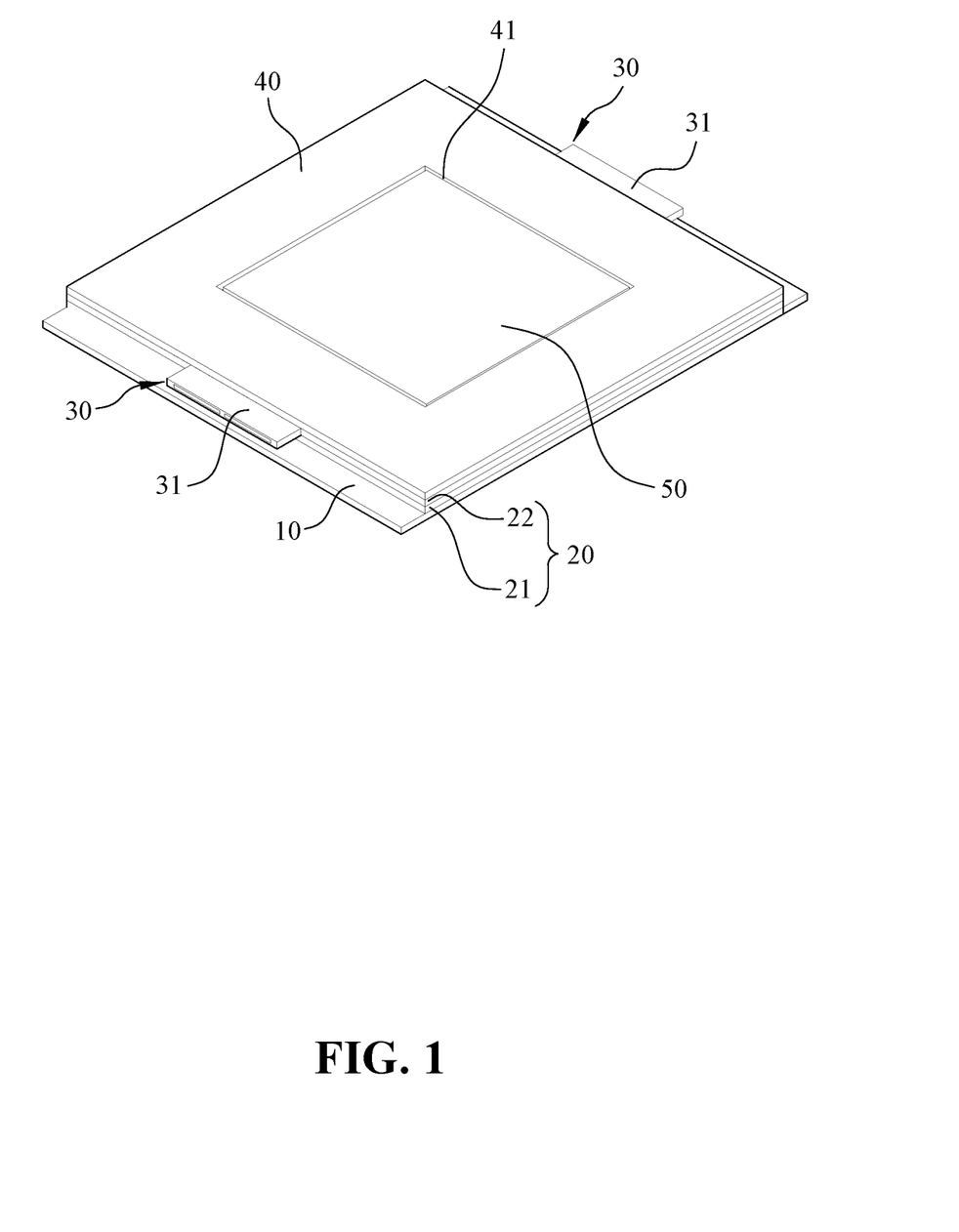
FIG. 1 is a perspective view of the present invention.
Figure 2:
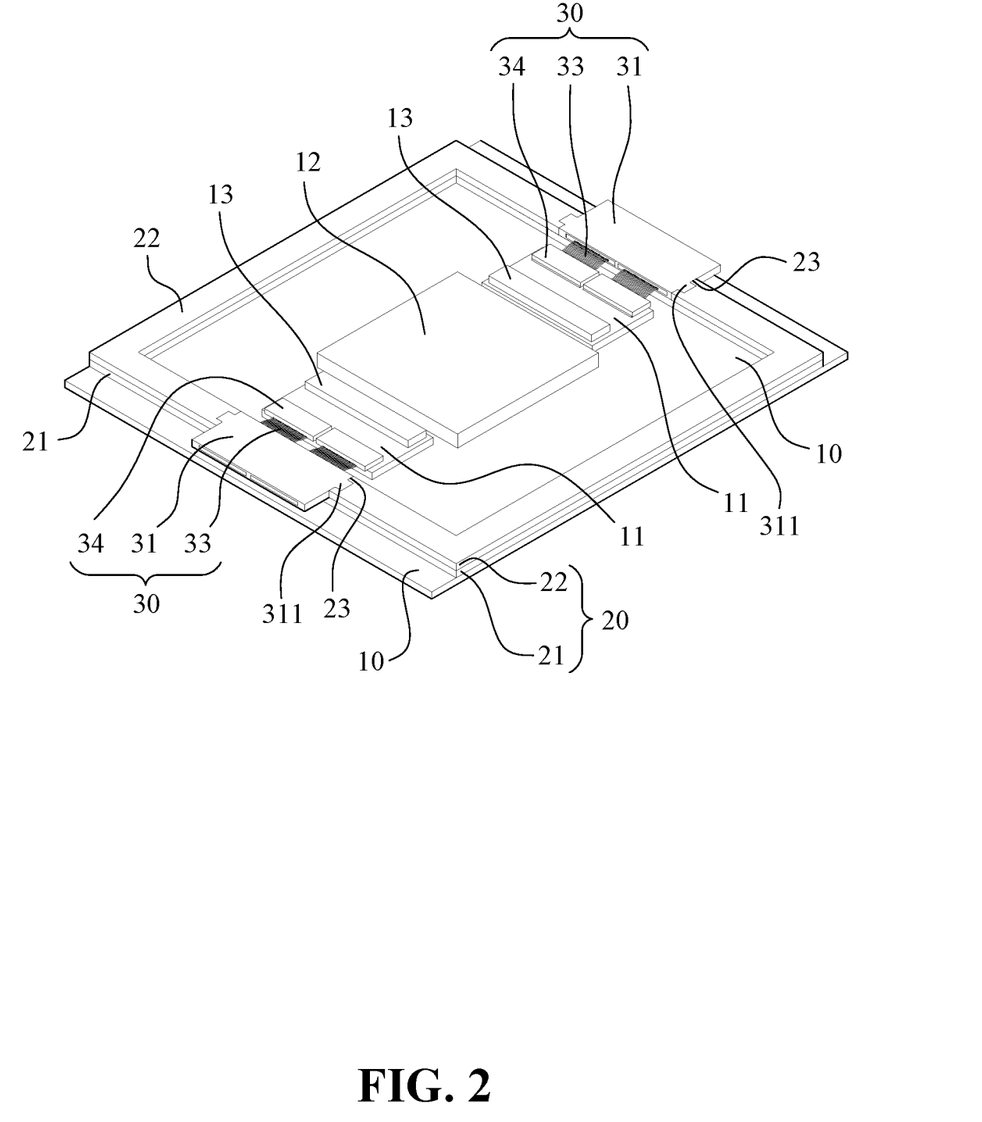
FIG. 2 is a schematic view of the internal structure of the present invention after removing the cover plate.
Figure 3:
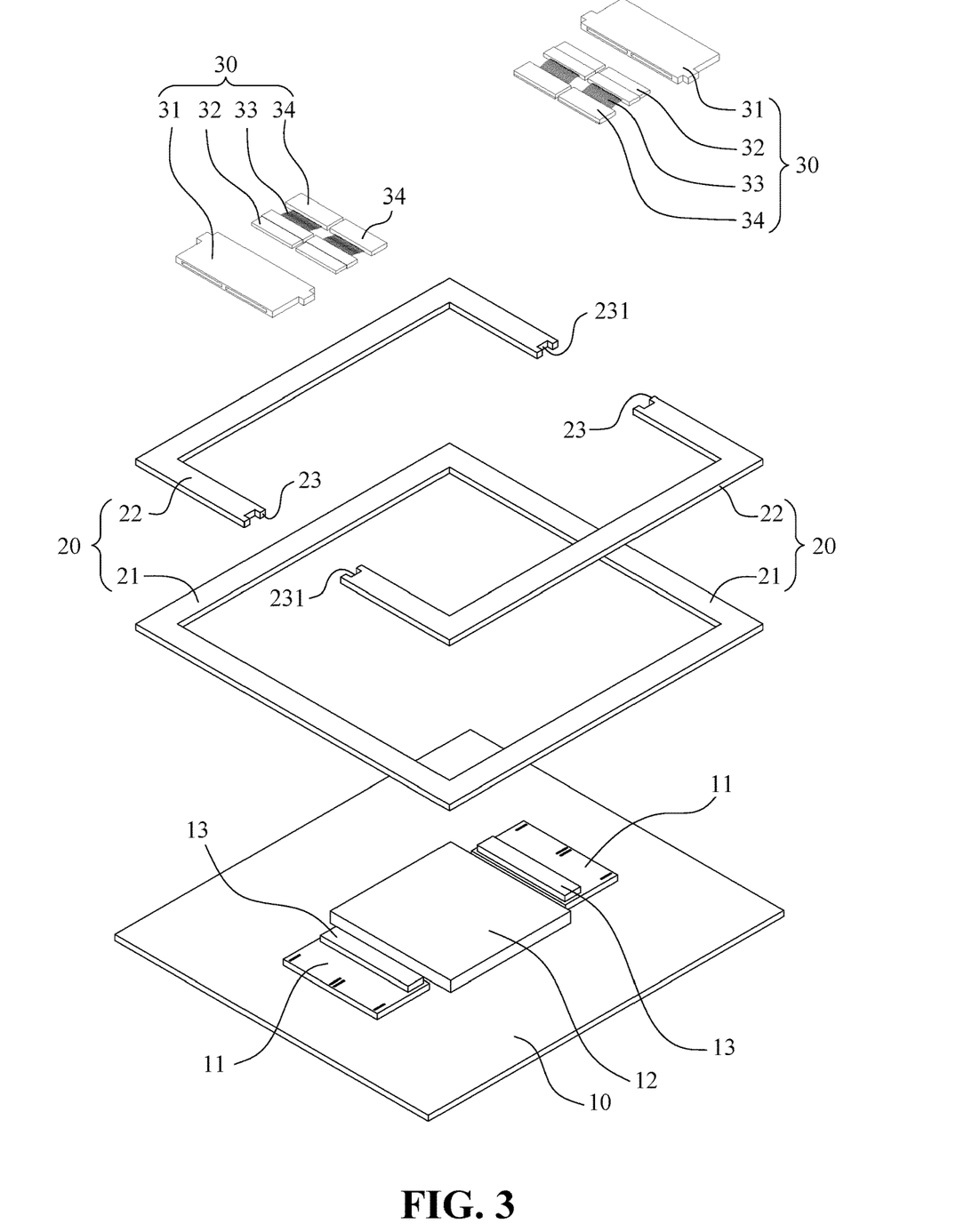
FIG. 3 is an exploded view of the present invention.

FIG. 1, FIG. 2 and FIG. 3 are respectively a perspective view, a schematic view of the internal structure, and an exploded view of the pluggable optical packaging structure of the present invention. The pluggable optical packaging structure of the present invention includes a substrate 10, a carrier ring 20, a plurality of optical connection assemblies 30, and a cover plate 40. At least one photonic integrated circuit 11 and at least one electronic integrated circuit 12, 13 are disposed on the substrate 10. The carrier ring 20 is located on the substrate 10, and the photonic integrated circuit 11 and the electronic integrated circuits 12, 13 are disposed in the area surrounded by the carrier ring 20. The optical connection assembly 30 includes at least one socket 31, at least one connector 32, a plurality of optical fibers 33, and at least one fiber array connector 34. The socket 31 is located in a partial section of the carrier ring 20, and the connector 32 is arranged in the socket 31. The optical fiber 33 has one end coupled to the connector 32, the other end coupled to the fiber array connector 34, and is coupled to photonic integrated circuit 11 through the fiber array connector 34. The cover plate 40 is located on the carrier ring 20 and extends inwardly to above the photonic integrated circuit 11.

As such, the pluggable optical packaging structure of the present invention utilizes a plurality of exposed sockets 31 as the medium for signal docking, and covers most of the top surface area by the cover plate 40, so that the optical fibers are not exposed during the packaging operation. When testing is to be performed after the packaging operation is completed, the optical fiber plug of the test equipment is inserted into the socket 31 and connected to the internal connector 32; thereby, the present invention can greatly reduce the breaking or damage to the optical fibers due to pulling in the packaging process, as well as simplify the difficulty of the packaging process and improve the yield of production.

The following describes the structure of each component in detail:

The substrate 10 is a silicon substrate, and the substrate 10 is provided with at least one photonic integrated circuit 11 (PIC) and at least one electronic integrated circuit (EIC). In the present embodiment, various electronic integrated circuits 12, 13 with different functions are included, such as central processing units, graphics processing units, converters, and so on. The photonic integrated circuit 11 provides the conversion function of optical signal and electrical signal. The electronic integrated circuit 13 and the photonic integrated circuit 11 are arranged on the substrate 10, and the integrated circuits can transmit signals through the single-layer or internal multi-layer circuit on the substrate 10. The electronic integrated circuit 13 can also be directly arranged on the photonic integrated circuit 11. In the present embodiment, the types and numbers of the photonic integrated circuits 11 and electronic integrated circuits 12 are not limited, and a plurality of the photonic integrated circuits 11 are mainly distributed close to the periphery of the substrate 10; that is, the positions are adjacent to the carrier ring 20. The electronic integrated circuits 12, 13 are arranged in the central area.

As shown in FIG. 3, the carrier ring 20 is arranged on the substrate 10 to increase the rigidity of the substrate 10 so as to facilitate the smooth progress of the semiconductor manufacturing process. In the present embodiment, the carrier ring 20 is a square or rectangular ring frame. The carrier ring 20 includes a bottom ring 21 and a plurality of fixing pieces 22, the plurality of fixing pieces 22 are arranged on the bottom ring 21 and form at least one gap 23. As shown in FIG. 2, the gap 23 is used for the socket 31 to be installed therein, and the gap 23 can also define a positioning groove 231. The positioning groove 231 enables the socket 31 to be installed therein more accurately and conveniently.

Figure 4:
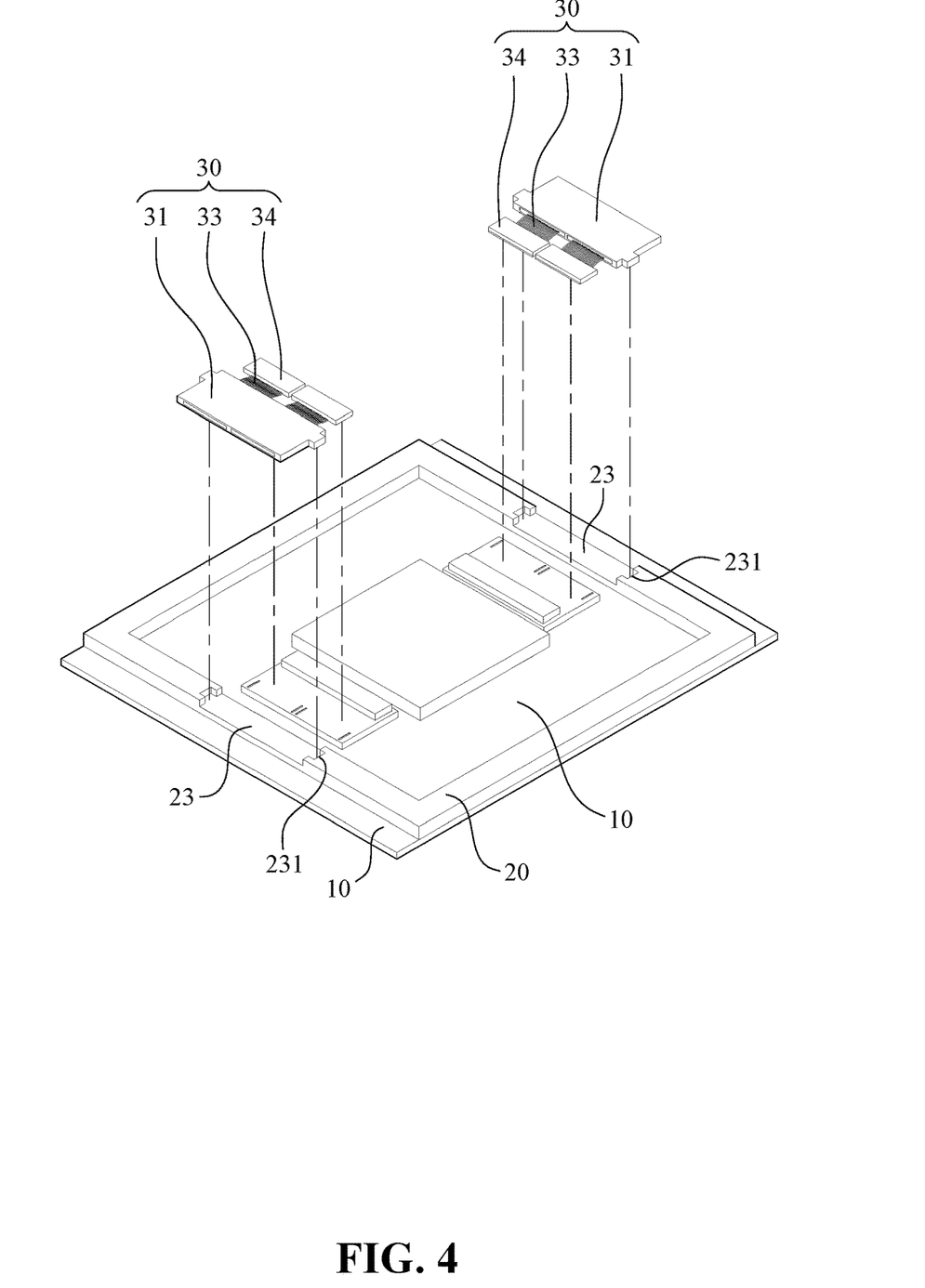
FIG. 4 is an exploded view of another embodiment of the present invention.

FIG. 4 shows another embodiment of the present invention. In the present embodiment, the carrier ring 20 is directly molded on the substrate 10, and the carrier ring 20 can have a plurality of gaps 23. The gap 23 is used for the socket 31 to be installed therein, and the gap 23 is also formed with a positioning groove 231 of a specific shape. In the present embodiment, the substrate 10 is directly molded into the structure of the carrier ring 20 during the semiconductor manufacturing process, thereby reducing the number of steps in the process and allowing subsequent components to be aligned or assembled more accurately and conveniently.

Figure 5:
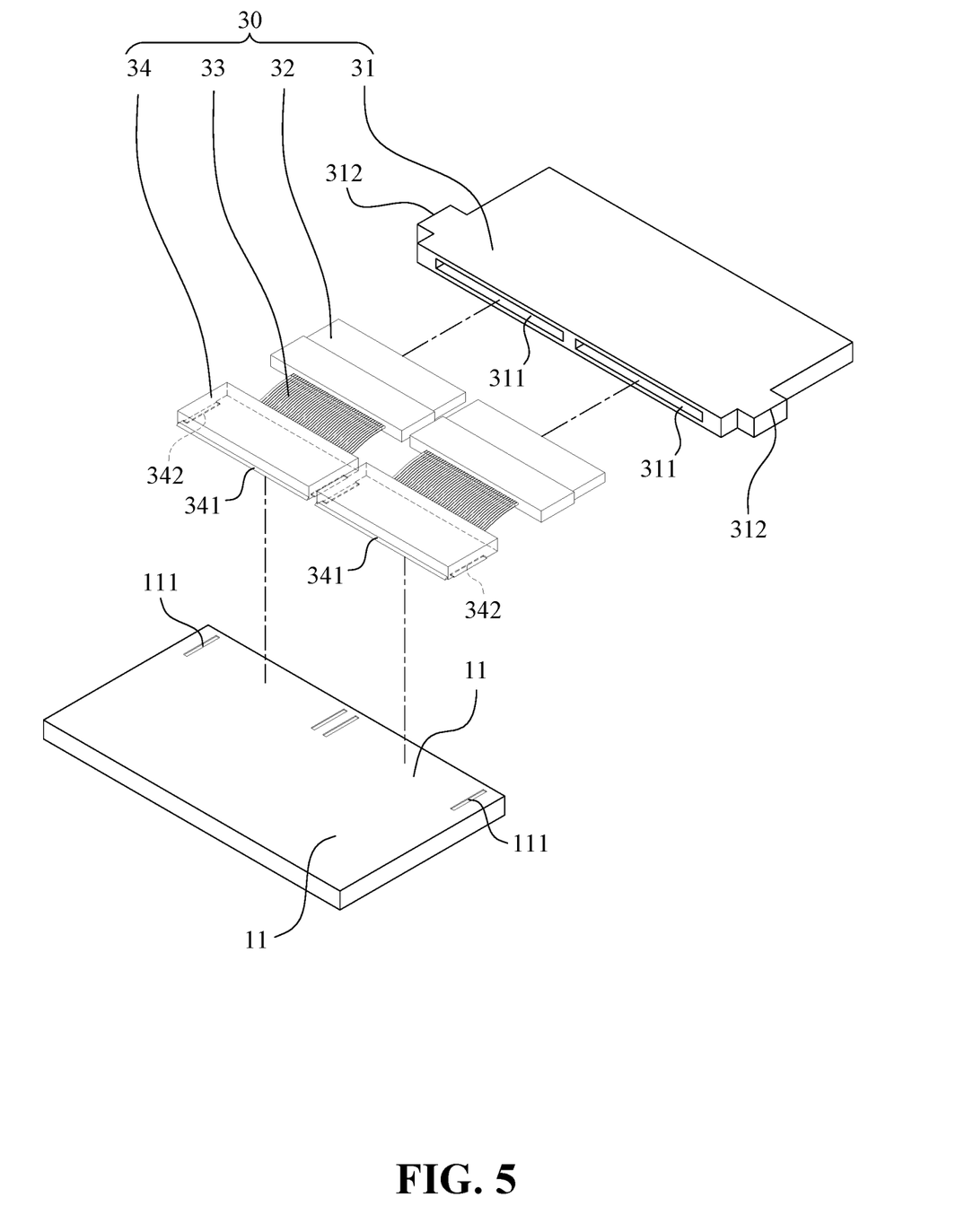
FIG. 5 is an exploded view of the optical connection assembly of the present invention.

As shown in FIG. 5, the optical connection assembly 30 is used for the coupling of the photonic integrated circuit 11 and the external plug. The optical connection assembly 30 includes the socket 31, the connector 32, the optical fibers 33, and the fiber array connector 34. The socket 31 is hollow and flat and has at least one through docking chamber 311. The number of the docking chambers 311 corresponds to the number of the connectors 32, but the length of the through space is greater than the connector 32. Therefore, when the connector 32 is fixed in the docking chamber 311, the external plug can be inserted from the other direction of the docking chamber 311, so that the optical signals are aligned with each other to accomplish the docking. A plurality of lugs 312 are disposed around the socket 31, and the shape of the lugs 312 corresponds to the positioning groove 231 so as to shorten the installation time of the socket 31 on the carrier ring 20 and ensure the accuracy of assembly. One end of the optical fiber 33 is connected to the connector 32, and the other end is coupled to the fiber array connector 34. The connector 32 is responsible for external signal connection, and the fiber array connector 34 is responsible for coupling to the photonic integrated circuit 11. The fiber optic array connector 34 shown schematically in the figure is a patented structure that utilizes the previous design of the present invention. The fiber array connector 34 has a plurality of V-shaped grooves inside for the plurality of optical fibers 33 to be glued therein, and is provided with a total reflection optical waveguide lens 341. In addition, in order to shorten the alignment time, the bottom of the optical fiber array connector 34 has at least one first coupling portion 342, and at least one second coupling portion 111 is provided at the corresponding position of the top of the photonic integrated circuit 11. In the present embodiment, the number of the second coupling portions 111 is two and the second coupling portions 111 are grooves. When assembling and aligning, the fiber array connector 34 is first inserted top down to be arranged on the photonic integrated circuit 11, so that the first coupling portion 342 is located in the second coupling portion 111. The plurality of optical fibers 33 is aligned with the photonic integrated circuit 11 through the optical fiber array connector 34 in a passive alignment operation, followed by fine-tuning and correction before gluing. Afterwards, the connector 32 is inserted into the socket 31 on the carrier ring 20 and then fixed, so that the assembly and alignment time can be greatly shortened, and the assembly of components can be quickly accomplished.

Figure 6:
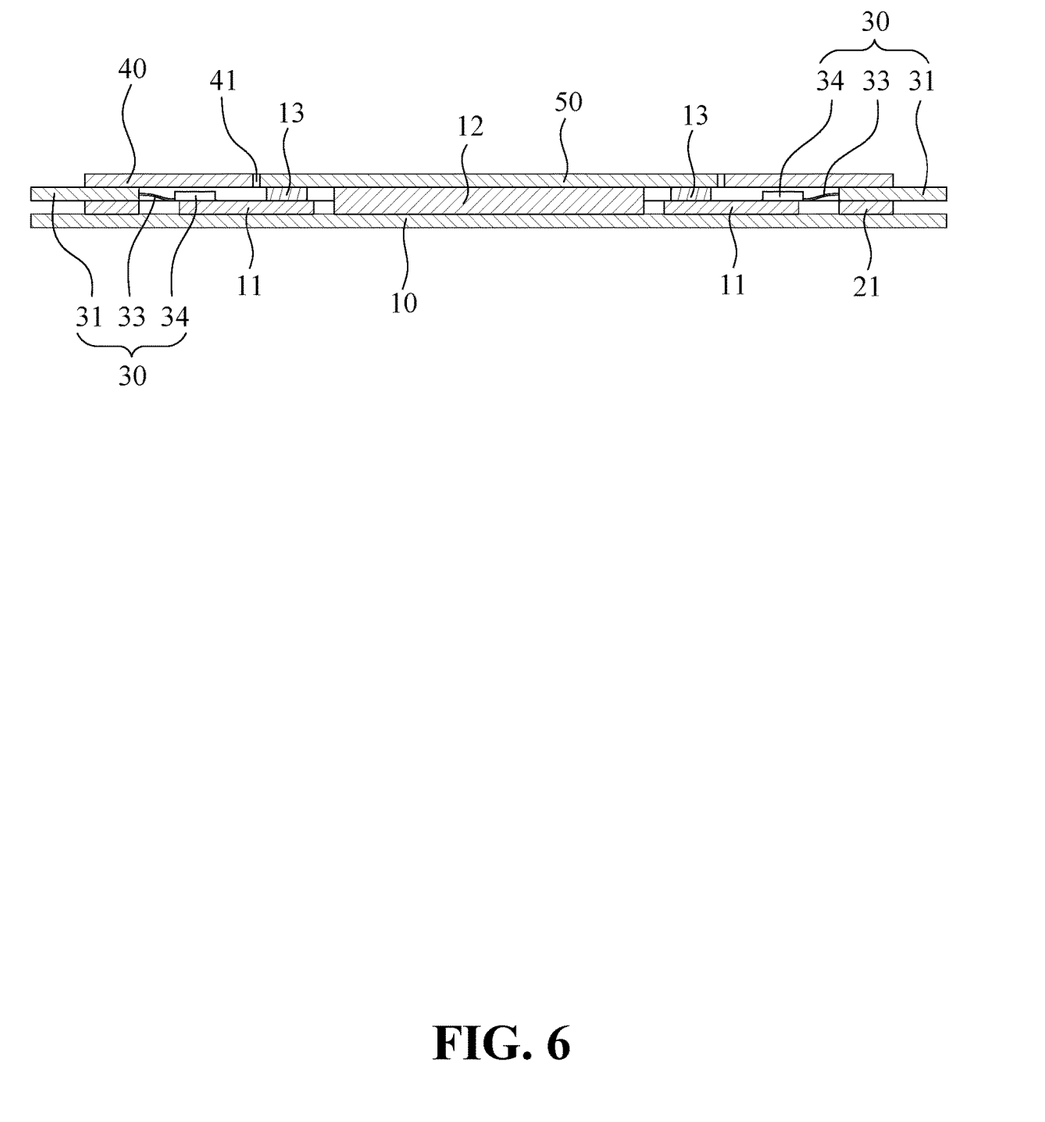
FIG. 6 is a cross-sectional view of the present invention.

As shown in FIG. 1 and FIG. 6, the cover plate 40 is arranged on the carrier ring 20 to cover the space above the photonic integrated circuit 11, so as to prevent other debris or impurity from entering the space during the packaging operation to cause damage to internal components. In the present embodiment, the cover plate 40 also has a window 41 in the center, and the window 41 is located above the electronic integrated circuits 12, 13. The present invention also includes a heat dissipation unit 50. In the present embodiment, the heat dissipation unit 50 is a heat sink with good thermal conductivity, such as a graphene sheet, which can also be called an integrated heat spreader (IHS). The IHS is a layer of metal material that is directly installed on the top of the IC by the IC processor manufacturer when manufacturing the IC processor, usually copper or aluminum, which can help dissipate heat and disperse the heat generated by IC processing, and cooperate with fans during operation to dissipate heat more effectively. As shown in FIG. 6, the heat dissipation unit 50 is directly glued on the top surface of the electronic integrated circuit 12, 13 during assembly, so that the heat generated by the electronic integrated circuit 12, 13 during operation can be rapidly conducted through the heat dissipation unit 50 go out.

Figure 7:
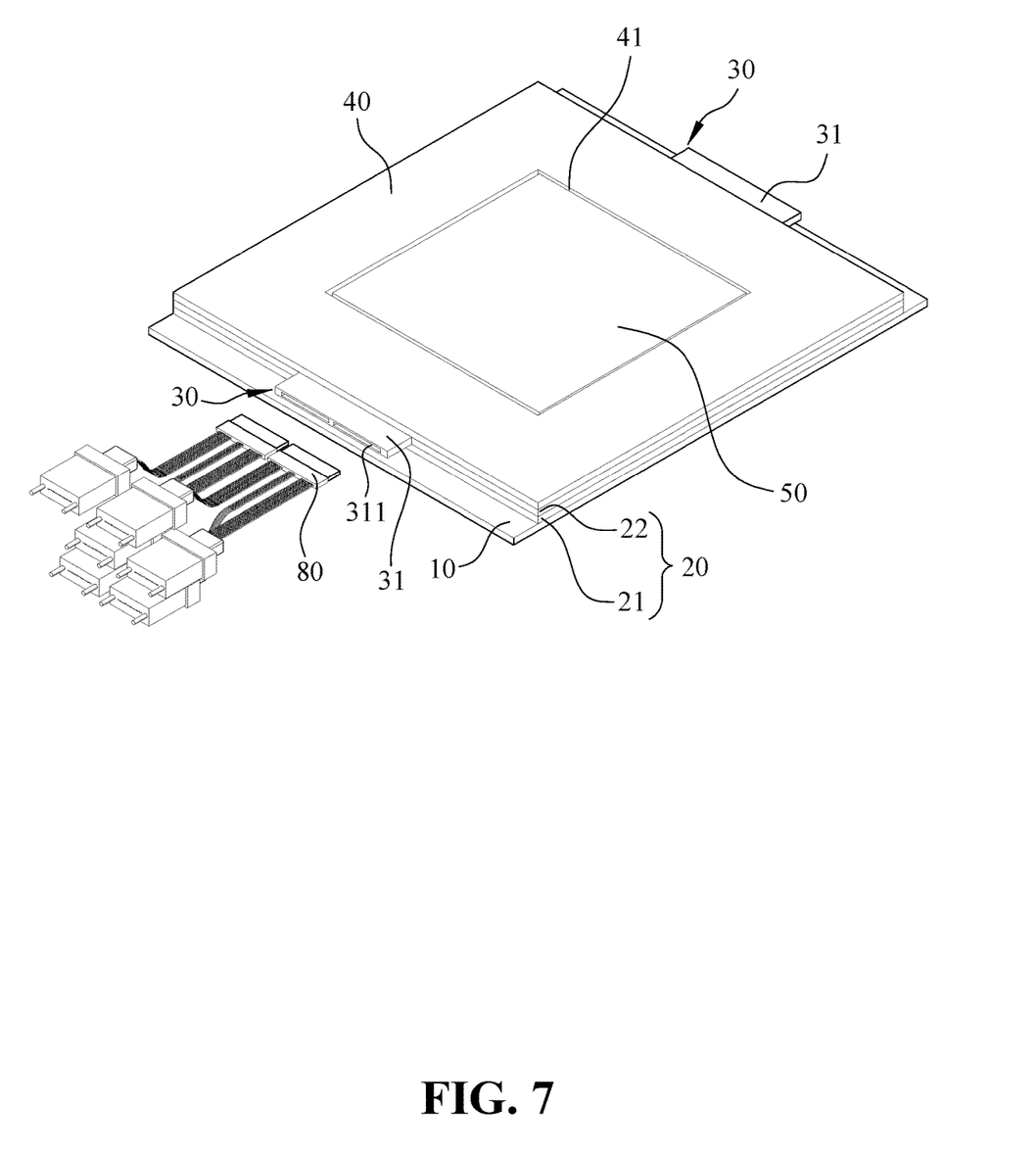
FIG. 7 is a schematic view of the actual use of the present invention.

FIG. 7 is a schematic structural view of the practical application of the present invention. The pluggable optical packaging structure of the present invention uses a plurality of exposed optical connection components 30 as a docking structure. More specifically, the present invention uses the protruding socket 31 for receiving the insertion of the external optical fiber plug 80 into the docking chamber 311 to dock with the internal connector 32 to complete the docking operation. The optical fiber plug 80 is connected to a test device during testing, and is connected to a laser light generator during actual operation. Therefore, the pluggable optical packaging structure of the present invention does not need to be connected with many optical fibers simultaneously during the packaging operation; that is, there will be no exposed optical fibers during the packaging operation, so that the packaging equipment factory can use the original mechanical equipment to carry out related operation without the need to re-develop new machines; thereby, the present invention can reduce equipment investment and use the original technology for production, and the yield rate is relatively improved.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A pluggable optical packaging structure, comprising:
a substrate, disposed with at least one electronic integrated circuit and at least one photonic integrated circuit;
a carrier ring, located on the substrate, and the at least one electronic integrated circuit and the at least one photonic integrated circuit being in an area enclosed by the carrier ring;
at least one optical connection assembly, comprising at least one socket, at least one connector, a plurality of optical fibers and at least one optical fiber array connector, the at least one socket being located in a partial section of the carrier ring, the at least one connector being disposed in the at least one socket, the optical fibers having one end coupled to the at least one connector, the other end coupled to the at least one optical fiber array connector, and coupled to the at least one photonic integrated circuit through the at least one optical fiber array connector; and
a cover plate, located on the carrier ring and extending inwardly to above the at least one photonic integrated circuit;
wherein the carrier ring has at least one gap, each of the at least one gap has at least one positioning groove, each of the at least one socket has at least one lug corresponding to the at least one positioning groove and when each of the at least one socket is arranged in one of the at least one gap, the at least one lug is positioned in the at least one positioning groove.

2. The pluggable optical packaging structure according to claim 1, further comprising a heat dissipation unit, the cover plate having a window at the center, and the heat dissipation unit being located in the window and in contact with the at least one electronic integrated circuit.

3. The pluggable optical packaging structure according to claim 2, wherein the heat dissipation unit is a heat sink, and the heat sink is located on the at least one electronic integrated circuit.

4. The pluggable optical packaging structure according to claim 1, wherein each of the at least one socket has at least one docking chamber, and the at least one connector is arranged in the at least one docking chamber.

5. The pluggable optical packaging structure according to claim 1, wherein the carrier ring comprises a plurality of fixing pieces stacked up and down in sequence and a bottom ring, the bottom ring is a closed ring and is located on the substrate, and the plurality of the fixing pieces are arranged on the bottom ring and form the at least one gap, and the at least one socket is located in the at least one gap.

6. The pluggable optical packaging structure according to claim 1, wherein each of the at least one optical fiber array connector has at least one first coupling portion, each of the at least one photonic integrated circuit has at least one corresponding second coupling portion provided on top, and when each of the at least one optical fiber array connector is arranged on one of the at least one photonic integrated circuit, the at least one first coupling portion is coupled to the at least one corresponding second coupling portion.

* * * * *